United States Patent [19]
Hamm et al.

[11] 3,811,123
[45] May 14, 1974

[54] LOW ENERGY INDICATOR

[76] Inventors: Jeffrey E. Hamm, 7432 Eastbourne Cir., Salt Lake City, Utah 84121; Robert S. Jenson, 2981 Middleton Way, Salt Lake City, Utah 84117

[22] Filed: Feb. 12, 1973

[21] Appl. No.: 331,905

[52] U.S. Cl............ 340/249, 340/237 S, 340/248 B
[51] Int. Cl. ............................................ G08b 19/00
[58] Field of Search............ 340/237 S, 249, 248 B, 340/253 C

[56] References Cited
UNITED STATES PATENTS
3,548,205   12/1970   Ogden .............................. 340/237 S Primary Examiner—John W. Caldwell
Assistant Examiner—Daniel Myer
Attorney, Agent, or Firm—H. Ross Workman

[57] ABSTRACT

A low energy indicator circuit disclosed as part of a smoke detection system and giving a pulsating alarm when the strength of the DC energy source diminishes below a preset reference level. The circuit includes a programmable unijunction transistor with its anode maintained at a reference potential and its gate connected so as to monitor the voltage delivered by the energy source. When the voltage at the gate diminishes below the reference voltage, the programmable unijunction transistor becomes conductive and discharges to the gate of a switching device which in turn energizes an alarm circuit.

4 Claims, 1 Drawing Figure

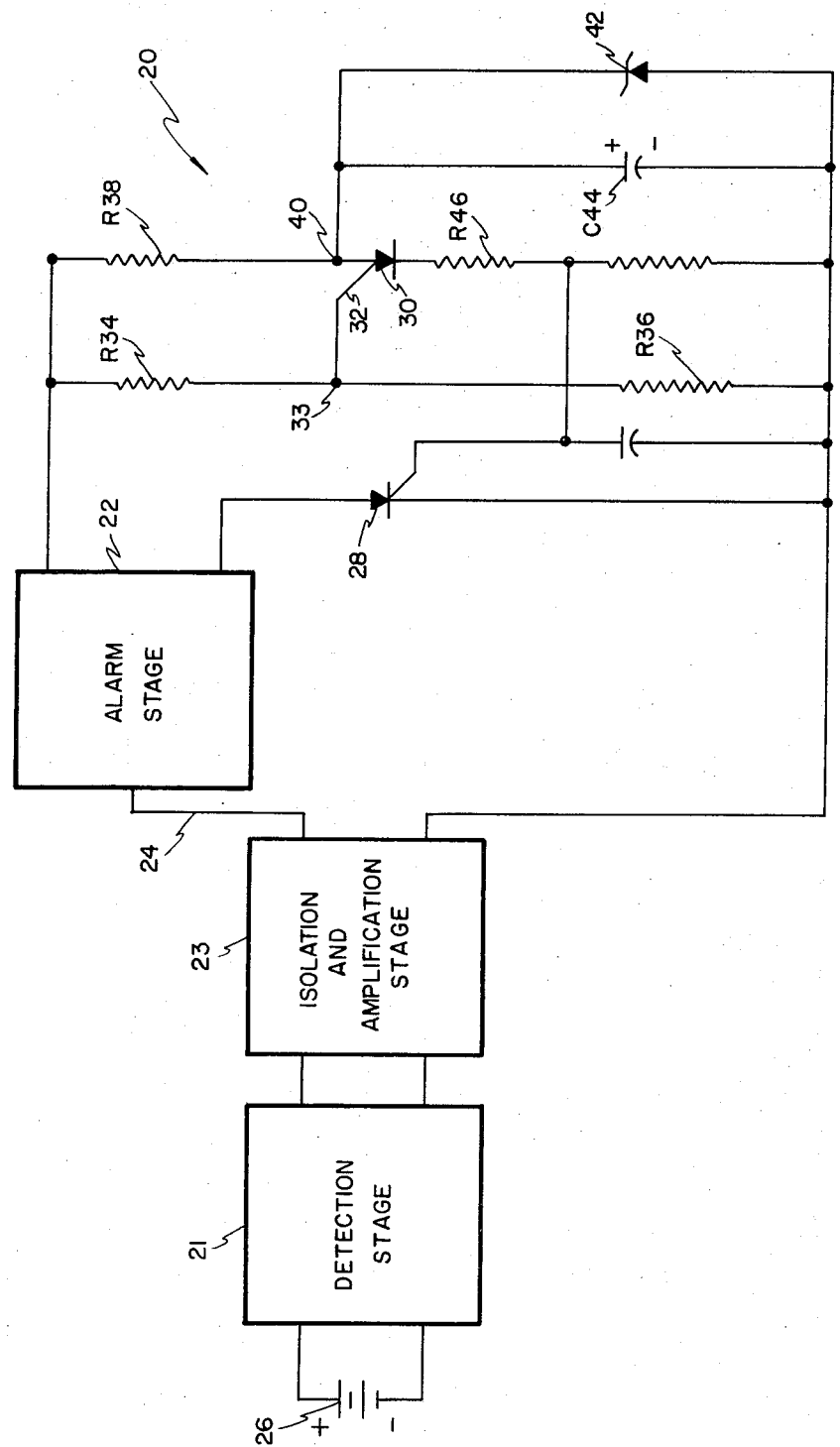

LOW ENERGY INDICATOR

BACKGROUND

1. Field of the Invention

The invention relates to an improved low energy indicator circuit for developing an alarm signal when the strength of a DC energy source diminishes below a preset reference level.

2. The Prior Art

Historically, one of the apparent disadvantages of using hazard warning devices which use a battery as an energy source is that the hazard warning device becomes inoperable without warning when the battery is low. For example, in fire and smoke detection systems, it is common to employ a DC energy source, such as a battery, to operate an ionization detection chamber and its attendant amplification and alarm circuitry. The fire detection system thus operated have been found to be useful protection devices as long as the battery delivers adequate energy to actuate and maintain the alarm in case of need.

The most common approach to battery maintenance has been to periodically make physical inspection of the battery and to check the strength of the battery with a volt meter. Often, periodic inspection and measurement of the strength of the battery is extremely inconvenient. Moreover, where the fire detection unit is used in a residence or business location, it is often unlikely that voltage measurement devices are available. Accordingly, regular service by an expert is required. Alternatively, the battery can be changed on a regular basis. Nevertheless, even though a battery is changed regularly, there is no assurance that the battery is viable throughout the duration of its use and battery replacement at too frequent intervals is expensive and wasteful.

It has long been desirable to provide a hazard warning device which would give clear positive indication that the device is approaching an inoperable state due to low energy supply. The persistent problem has been that generation of a perceptible warning of diminished energy supply in itself requires energy. If the battery does not have sufficient strength to operate the electronics of the hazard warning device, it may not have sufficient energy to maintain a low battery indicator alarm. The use of multiple power supplies or other types of power sources have not alleviated the problem because of additional costs and restriction in the mobility of the hazard warning device.

BRIEF DESCRIPTION AND OBJECTS OF THE INVENTION

The present invention relates to a low battery indicator circuit which develops a pulsed alarm signal when the strength of the DC energy source diminishes below a preset reference level. The reference potential can be maintained at a level which is sufficiently high to accommodate a prolonged low battery indication warning but sufficiently low to demonstrate actual battery power loss.

Accordingly, it is a primary object of the present invention to provide an improved indicator of low source energy.

It is another primary object of the present invention to provide circuitry for use with hazard warning devices such as a battery-operated aerosol detection system for developing an alarm signal when the battery power diminishes below a preset reference level.

These and other objects and features of the present invention will become more fully apparent from the following description and appended claims taken in conjunction with the accompanying drawing.

BRIEF DESCRIPTION OF THE DRAWING

The FIGURE is a schematic circuit diagram illustrating one presently preferred low battery indicator circuit embodiment of the invention, portions of the circuit being shown in block form.

DETAILED DESCRIPTION OF THE PREFERRED EMBODIMENT

Reference is now made to the FIGURE which schematically illustrates a presently preferred embodiment of the invention. While the illustrated low energy indicator circuitry generally designated 20 could be used with any suitable electronic circuitry having a DC energy source, the indicator circuitry 20 will be described in connection with a smoke or aerosol detection system such as that described in our copending U. S. Pat. application Ser. No. 329,285, filed Feb. 2, 1973.

The alarm stage 22 of the circuit is normally connected to a detection stage 21 and an isolation and amplification stage 23. When the detection stage 21 is altered from the steady state, a signal appears on line 24 triggering the alarm circuit to a full "ON" position. In one preferred embodiment, the alarm stage 22 comprises an audible buzzer which remains on as long as the detection stage 21 remains out of the steady state. Commonly, the alarm signal in line 24 appears when smoke or aerosols alter the conductivity of an ionic detection chamber. The change in conductivity is detected, isolated and amplified at stage 23 to develop the alarm signal.

It is also common to drive the detection and amplification circuits 21 and 23 as well as the alarm circuit 22 with a DC energy source 26, usually in the form of a battery. It is elemental that when the battery 26 deteriorates in strength with the passage of time or as a result of frequent use, the successful operation of the detection stage 21 and isolation and amplification stage 23 becomes increasingly more in doubt. The low battery indicator circuitry generally designated 20 is designed to monitor the existing capacity of the DC energy source 26 as will now be more fully described.

In addition to being responsive to an alarm signal in line 24, the alarm stage 22 is also responsive to the operation of a silicon-controlled rectifier (SCR) 28 connected between the alarm stage and ground. The gate of the SCR 28 is electrically connected to the cathode or output terminal of a programmable unijunction transistor (PUT) 30. The gate 32 of the PUT 30 is connected at node 33 between resistors R34 and R36. The anode of the PUT 30 is connected through resistor R38 to the positive terminal of the energy supply 26 and is also connected at node 40 to the zener diode 42 and capacitor C44 connected in parallel with the zener diode.

The zener diode 42 maintains a predetermined voltage at node 40. For example, in the illustrated embodiment, it is presently preferred that approximately 8.2 volts be maintained at the node 40. The values of resistors R34 and R36 are selected so that when the battery 26 is essentially full strength, approximately 8.4 volts will appear at the node 33. It is observed that as long as the gate voltage (at node 33) is higher than the anode voltage (at node 40) the PUT 30 will remain non-conductive. In the non-conducting stage, the capacitor 44 is fully charged.

As the strength of battery 26 deteriorates, the voltage at node 33 will diminish until it is less than the voltage at node 40. When the voltage at node 40 dominates, the PUT 30 will become conductive and the capacitor C44 will discharge through the PUT through resistor R46 to the gate of the SCR 28. Thus, the SCR will be switched on and the alarm stage 22 will be energized. When the capacitor C44 has discharged, the voltage at node 40 will have dropped from approximately 8.2 volts to a small positive voltage. As the voltage at node 40 goes low, the PUT 30 will become non-conductive thereby switching the SCR 28 off, terminating the alarm at the alarm stage 22 and facilitating recharge of the capacitor C44.

As the charge on capacitor C44 accumulates, the voltage at node 40 will rise to its intended reference point. As long as the reference voltage at node 40 is higher than the voltage at node 33 (due to deterioration of the battery 26) the PUT will again become conductive when the voltage at node 40 rises above the voltage appearing at node 33. Thus, when the battery 26 becomes incapable of maintaining the voltage at node 33 above the reference voltage at node 40, the PUT will become cyclically conductive and non-conductive thereby facilitating discharge of the capacitor C44 through the PUT to the gate of SCR 28. The result is activation of the alarm stage 22 in rapid successive intervals.

The pulsation of the alarm signal appearing at the alarm stage 22 due to the low battery indicator circuit 20 is advantageous because an audible alarm developed at the alarm stage 22 will be of the pulsating type and thereby easily distinguished from the constant alarm sound developed due to the presence of smoke or the like sensed at the detection stage 21. Accordingly, using the identical alarm stage 22, the low battery indicator circuitry 20 advantageously develops an alarm uniquely signifying a dangerously low capability of the battery 26.

Clearly, the type of alarm signal developed by the alarm stage is not critical to this invention. The alarm may include the illumination of lights or the activation of warning dials or any other suitable alarm giving device.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A low energy indicator for an aerosol detection device comprising:
   a direct current energy source for supplying power to the electrical circuit of the aerosol detection device;
   means monitoring the voltage delivered by the energy source;
   means for maintaining a reference voltage derived exclusively from the energy source which reference voltage is selected so as to be below a predetermined voltage range normally communicated to the monitoring means by the energy source;
   means developing an output signal when the voltage communicated by the energy source to the monitoring means is lower in magnitude than the reference voltage; and
   means responsive to the output of the developing means perceptibly indicating the reduced voltage at the monitoring means.

2. A low energy indicator as defined in claim 1 wherein said developing means comprises a programmable unijunction transistor and wherein said monitoring means comprises the gate of the programmable unijunction transistor.

3. A low energy indicator as defined in claim 2 wherein said maintaining means comprises a zener diode connected between ground and the anode of the programmable unijunction transistor, the value of the zener diode being selected to maintain the reference voltage at the anode of the programmable unijunction transistor.

4. A low energy indicator comprising:
   a battery comprising a source for delivering direct current to an electrical circuit;
   a programmable unijunction transistor (PUT) connected across the direct current source so that the voltage appearing at the gate of the PUT is a function of the battery strength;
   means for delivering a direct current reference potential to the anode of the PUT, the reference potential originating at the battery and modified by the delivering means so as to be lower in magnitude than the normal voltage appearing at the PUT gate, the PUT remaining non-conductive as long as the gate voltage is higher than the reference potential;
   means for storing an electrical charge, said storing means being electrically connected to the anode of the PUT and discharging through the PUT only when the PUT becomes conductive due to reduction of the gate voltage below the reference potential;
   switching means responsive to the output of the conducting PUT to energize an alarm circuit.

* * * * *